(No Model.)

M. A. CLENNAM.
CONNECTING ROD JOINT AND BEARING.

No. 471,953. Patented Mar. 29, 1892.

Witnesses,
J. H. Krouse
J. A. Bayless

Inventor,
Milton A. Clennam
By Dewey & Co.,
Att'ys

THE NORRIS PETERS CO., PHOTO-LITHO., WASHINGTON, D. C.

UNITED STATES PATENT OFFICE.

MILTON A. CLENNAM, OF SAN FRANCISCO, CALIFORNIA, ASSIGNOR OF ONE-HALF TO WELDON C. RARIG, OF SAME PLACE.

CONNECTING-ROD JOINT AND BEARING.

SPECIFICATION forming part of Letters Patent No. 471,953, dated March 29, 1892.

Application filed December 28, 1891. Serial No. 416,358. (No model.)

*To all whom it may concern:*

Be it known that I, MILTON A. CLENNAM, a citizen of the United States, residing in the city and county of San Francisco, State of California, have invented an Improvement in Connecting-Rod Joints and Bearings; and I hereby declare the following to be a full, clear, and exact description of the same.

My invention relates to a novel connecting-rod joint and bearing; and it consists of the construction and combination of devices which I shall hereinafter fully describe and claim.

Figure 1:
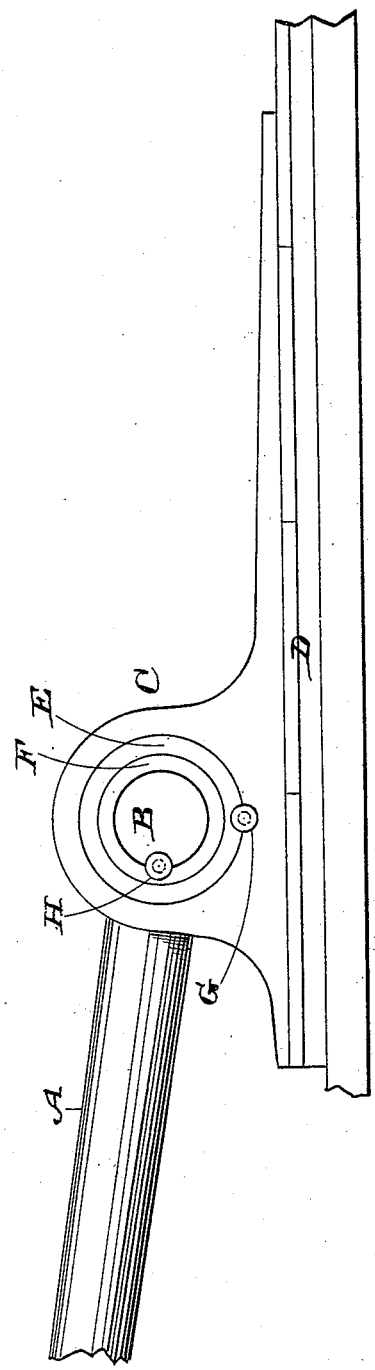
Figure 2:
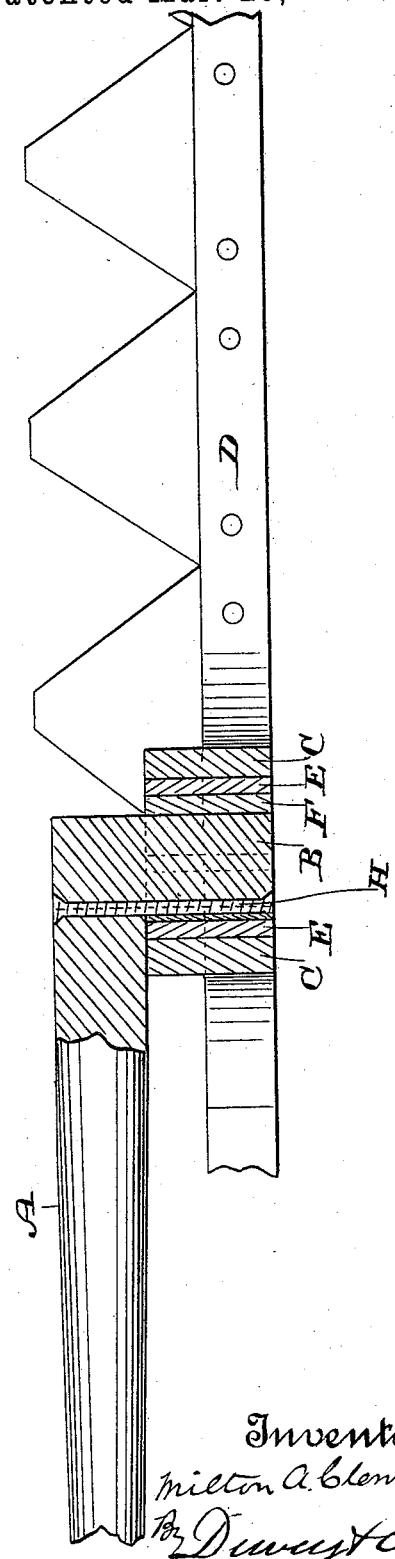

Figure 1 is a side elevation showing one application of my device. Fig. 2 is a plan view with a section of the joint.

In the present case I have shown my invention as applied to the connecting-rod joint employed upon mowing-machines and harvesters; but it will be manifest that it may be applied at various other points where there are joints or bearings subject to considerable wear.

A is a connecting-rod having the pin B.

C is the box, in which in the present case it is shown connected with the reciprocating cutter-bar D of a mowing-machine or harvester. The rapid oscillation of these parts soon wears out the joint and makes it necessary to renew it or compensate for wear; but on account of the small size and the complication of ordinary compensating devices they are not practical for application to this class of joint. I therefore bore out the box C to an interior diameter sufficiently larger than that of the pin B to admit two sleeves E and F, one of which is fitted tightly within the box and the other is fitted tightly upon the pin or shaft. The interior and outer surfaces, respectively, of these two form the wearing-joint. These sleeves are made of any suitable material, like hardened steel, phosphor-bronze, or other material common or useful for wearing surfaces. In order to removably secure these sleeves to the respective parts B and C, I have shown keys G and H. The key G serves to lock the outer sleeve E within the box and the key H locks the inner sleeve F upon the pin or shaft.

These keys may be made separate and put in after the sleeves are fitted in place, the ends being headed into countersunk openings, as shown, or the sleeves may be drop-forged or drawn like tubing with the keys formed upon their surfaces, a corresponding slot or groove being made in the opposing surface into which key will fit. These keys being headed down, as shown, serve as a lock to keep the parts in position and prevent the pin from drawing out. By this construction the interior of the box and the exterior of the pin or shaft are entirely preserved from wear, the wearing surface lying between the two sleeves, and when these sleeves become too much worn for proper adjustment they are easily removed and replaced by new ones at a trifling expense and without affecting the larger and more important parts.

Having thus described my invention, what I claim as new, and desire to secure by Letters Patent, is—

1. The combination of a connecting-rod having a pin or shaft, the exterior box or casing, the removable sleeves fitted to the exterior surface of the pin and interior surface of the box, respectively, with their adjacent faces movable upon each other, and means for locking one of the sleeves to the pin and the other to the exterior casing, substantially as herein described.

2. A connecting-rod joint or bearing consisting of the pin or shaft, an exterior box, a sleeve fitting the pin, and a second sleeve fitting the interior of the box and having their adjacent faces forming a movable joint upon each other, in combination with the keys G and H, locking the sleeves respectively to the pin and the interior of the box, said keys having their outer ends headed and fitting countersunk depressions in the box, pin, and the sleeves, substantially as herein described.

In witness whereof I have hereunto set my hand.

MILTON A. CLENNAM.

Witnesses:
S. H. NOURSE,
J. A. BAYLESS.